(12) United States Patent
Ottestad et al.

(10) Patent No.: US 6,752,168 B1
(45) Date of Patent: Jun. 22, 2004

(54) SYSTEM FOR CONTROLLING THE WORKING CONDITIONS FOR MECHANICAL PUMPS, AND A REGULATION VALVE FOR SUCH A SYSTEM

(75) Inventors: Nils T Ottestad, Tønsberg (NO); Finn Wichstrom, Hvalstad (NO)

(73) Assignees: Aker Maritime ASA, Oslo (NO); Ottestad Breathing Systems AS, Husoysund (NO)

( * ) Notice: Subject to any disclaimer, the term of this patent is extended or adjusted under 35 U.S.C. 154(b) by 0 days.

(21) Appl. No.: 10/129,746
(22) PCT Filed: Nov. 10, 1999
(86) PCT No.: PCT/NO99/00339
§ 371 (c)(1),
(2), (4) Date: Aug. 23, 2002
(87) PCT Pub. No.: WO01/34982
PCT Pub. Date: May 17, 2001
(51) Int. Cl.[7] ............................................. F16K 31/124
(52) U.S. Cl. ........................................ 137/220; 137/492
(58) Field of Search .............................. 137/220, 492

(56) References Cited

U.S. PATENT DOCUMENTS

| | | |
|---|---|---|
| 4,213,735 A | 7/1980 | Grennan |
| 5,490,539 A | 2/1996 | Ottestad |
| 5,685,332 A | 11/1997 | Overdiek et al. |

FOREIGN PATENT DOCUMENTS

| | | |
|---|---|---|
| DE | 44 12 461 A 1 | 10/1995 |
| EP | 0 127 717 | 10/1987 |
| GB | 2 042 094 A | 9/1980 |
| WO | WO 86/00731 | 1/1986 |
| WO | WO 93/11383 | 6/1993 |

Primary Examiner—Gerald A. Michalsky
(74) Attorney, Agent, or Firm—Davidson, Davidson & Kappel, LLC (57) ABSTRACT

A system for controlling the working conditions for mechanical pumps supplying associated devices with pressure fluid via a pipe system. A valve means (25) is placed between at least one of the pumps and an appurtenant device supplied by the pump, which valve means is arranged to open only when the pump has started up, and by adjustment of its flow cross-section seeks to maintain its downstairs pressure at a value (P3) which is predetermined from the specifications of the pipe system and said device, but gives priority to restrict its flow cross-section so that counterpressure of the pump does not fall below a given minimum value (P2) determined from the characteristic properties of the pump. The valve means is a regulating valve (25) operating in accordance with this functional principle. The regulating valve is based on a servo function utilising the Upstream pressure of the valve, the valve comprising a main valve body (34) having an end surface constituting a movable surface in the servo chamber (36), the volume of the servo chamber, and thereby the flow cross-section of the regulating valve, being regulated by a pair of control valves (43, 44) affected by the upstream pressure and the downstream pressure, respectively.

14 Claims, 7 Drawing Sheets

SYSTEM FOR CONTROLLING THE WORKING CONDITIONS FOR MECHANICAL PUMPS, AND A REGULATION VALVE FOR SUCH A SYSTEM

The invention relates to a system for controlling the working conditions for mechanical pumps supplying associated devices with pressure fluid via a pipe system Further, the invention relates to a regulating valve for use in such a system.

When mechanical pumps are used for transporting a liquid, it is important to use regulating valves taking into account the characteristic of the pumps as well as of the devices served by the pumps. Especially for pumps having a large output it is important that the pumps in the starting phase get a counterpressure preventing them from "cavitating out".

A typical system of the current type is a fire water system on an offshore installation. Such a system normally will comprise a very large pipe system having large variations in static and dynamic pressure. There will be a need for a number of regulating valves which are able to control the supply of water to the different sections in the installation. A typical size of regulating valves of the current type is from 4" to 12". Maximum through-flow will correspond to 10–20 m$^3$/s liquid flow into the valves. The total pump output for the liquid flowing in the system may be up to 8000 kW.

The object of the invention is to provide a system of the current type which is provided with one or more valve devices ensuring satisfactory working conditions for all types of pumps transporting gas or liquid in the system.

The above-mentioned object is achieved with a system of the introductorily stated type which, according to the invention, is characterised in that a valve means is placed between at least one of the pumps and an appurtenant device supplied by the pump, which means is arranged to open only when the pump has started up, and by adjustment of its flow cross-section seeks to maintain its downstream pressure at a value which is predetermined from the specifications of the pipe system and said device, but gives priority to restrict its flow cross-section so that the counterpressure of the pump does not fall below a given minimum value determined from the characteristic properties of the pump.

According to the invention there is also provided a regulation valve comprising a housing having a through passage for through-flow of a fluid via an inlet having an upstream pressure and via an outlet having a downstream pressure, a main valve body defining the flow cross-section of the passage in cooperation with a valve seat, and a servo chamber communicating with a control valve means for influencing the movement of the main valve body, which regulating valve is characterised in that the main valve body has an end surface constituting a movable surface in the servo chamber, the servo chamber being so dimensioned in relation to the sealing surface of the valve seat that the main valve body gets a net force surplus to be moved towards the seat when the pressure of the servo chamber is increased up towards the upstream pressure of the valve, and that the control valve means comprises a first and a second control valve which, under the influence of the upstream pressure and the downstream is pressure, respectively, is arranged to regulate the volume of the servo chamber so that the main valve body is moved towards an increased flow cross-section if the upstream pressure exceeds a preset minimum value and the downstream pressure simultaneously is lower than a preset value.

By means of the invention there is provided a purely mechanical regulating valve monitoring both its upstream pressure and its downstream pressure simultaneously, and which is arranged to regulate in such a manner that the superior functional requirements for the entire pipe system are complied with. As a result of the fact that the regulating valve has such properties, the mechanical stresses on pumps, pipe system etc. will be able to be considerably reduced. Another important advantage is that the pump capacity can be utilised in a better manner in that the valve parameters are preset from the placing of the regulating valve in the pipe system. One is then let off from mounting throttling discs etc. to compensate for hydrostatic variations or a change in pipe dimensions etc. This will in turn make it possible to utilise the liquid supply capacity optimally and simultaneously save energy.

The invention will be further described below in connection with exemplary embodiments with reference to the drawings, wherein.

Figure 1:
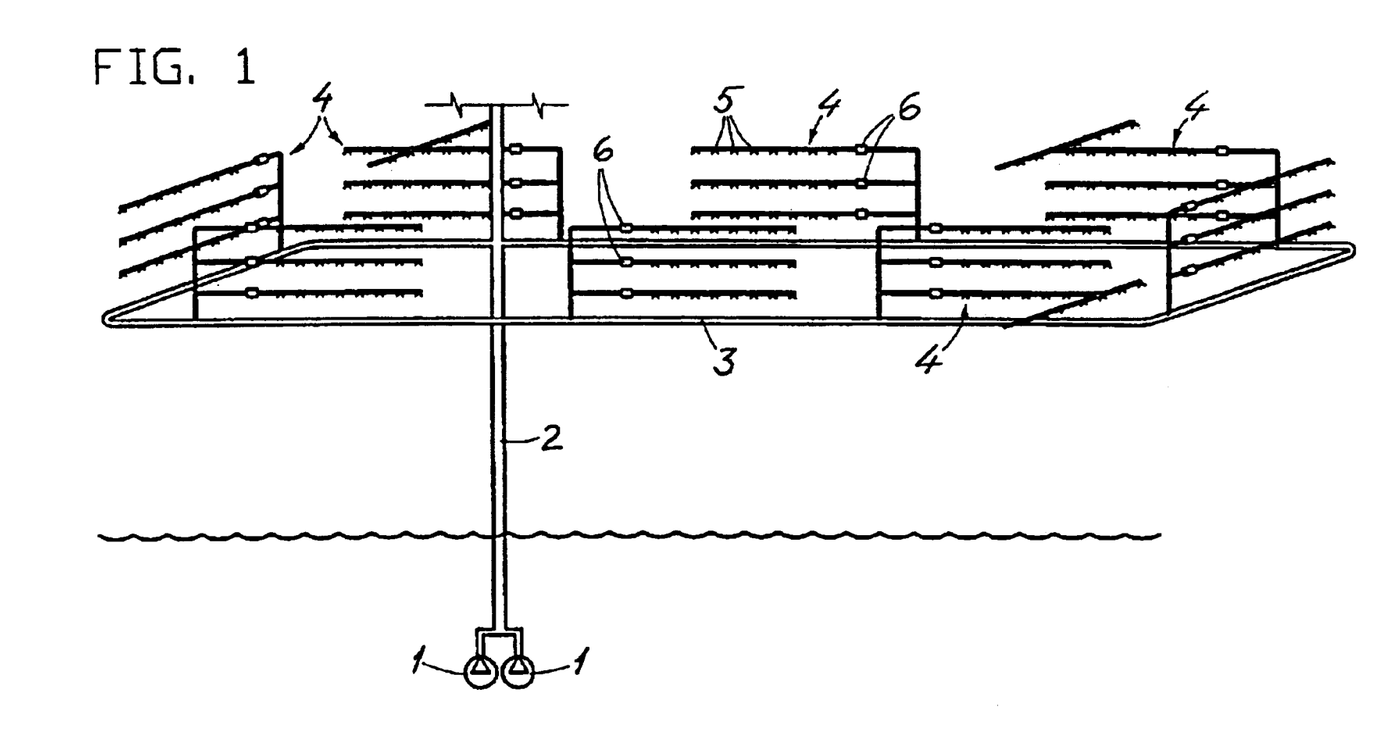
FIG. 1 shows a schematic view of a pipe system comprising regulating valves for controlled supply of water to associated outlet sections.

FIG. 1 shows a fire water system of the type used on offshore installations. The system is shown to comprise a pair of parallelly working pumps 1 which, via a riser 2 and a ring conduit 3, supply water to a plurality of outlet sections 4 in the system. In the figure there is shown only one ring conduit, but such a system may comprise several ring conduits arranged at different levels in the installation. Each of the outlet sections 4 is shown to comprise several parallel branches of which each comprises a plurality of nozzles 5 and a valve device 6 which is connected between the nozzle collection and the ring conduit 3.

In a system according to the invention, the valve devices 6 are constituted by regulating valves constructed in accordance with the functional principle according to the invention stated above, namely such that the valve, by adjustment of its flow cross-section, seeks to maintain its downstream pressure at a value which is determined from the specifications of the pipe system and the device supplied by the pump, but gives priority to restrict its flow cross-section so that the counterpressure of the pump does not fall below a given minimum value determined from the characteristic properties of the pump.

A regulating valve of the relevant type may be manufactured in a number of different designs without this changing the main principle for regulating the cross-section of flow. The main principle, which is identical irrespective of whether the pump delivers a gas or a liquid, will be explained with reference to FIGS. 2A and 2B. For the sake of simplicity, water is presupposed as the medium in the description.

Figure 2A:
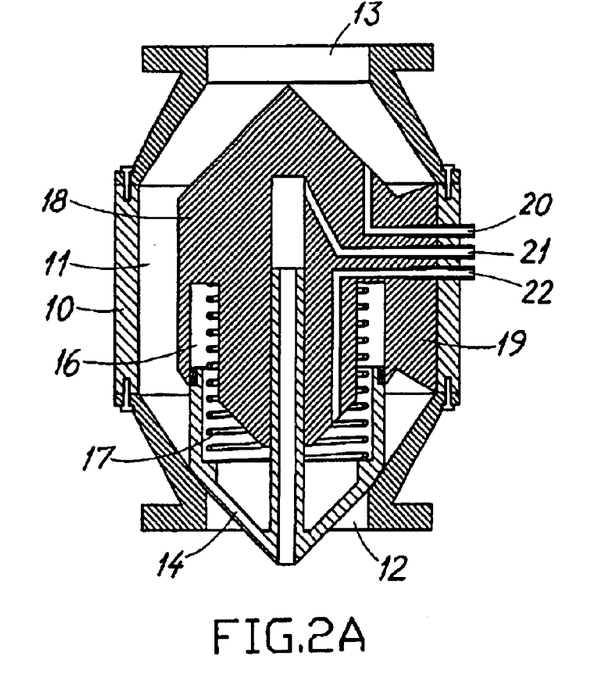
FIGS. 2A and 2B show longitudinal sectional views of a first embodiment of a regulating valve according to the invention, in closed and open position, respectively.
Figure 2B:
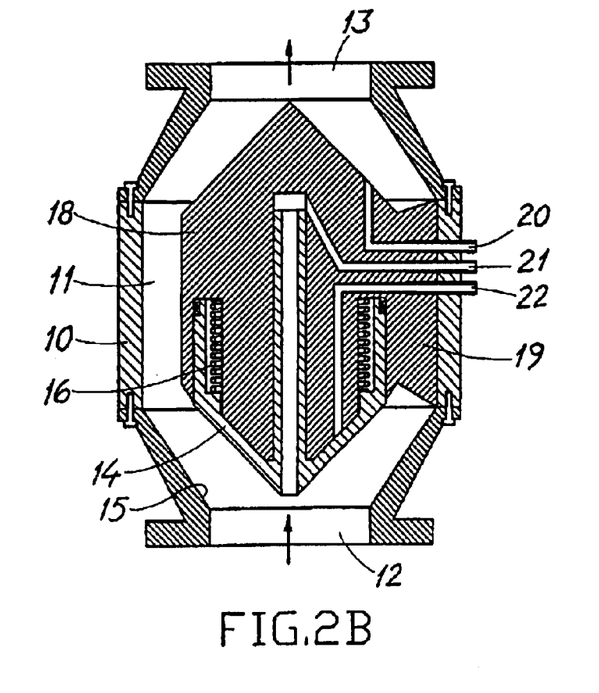

The regulating valve shown in FIGS. 2A–2B comprises a housing 10 having a through duct or passage 11 for through-flow of water via an inlet 12 having an upstream pressure ($P_u$) and via an outlet 13 having a downstream pressure ($P_d$). A main valve body 14 cooperates with a valve seat 15 for defining the through-flow cross-section of the passage 11. The valve body 14 is slidably arranged in a servo chamber 16 and is influenced by a spring 17 seeking to return the valve body 14 towards the seat 15. The valve body has an end surface constituting a movable surface in the servo chamber 16, and the valve body forms a piston of which the cross-section is chosen larger than the sealing surface of the seat 15. Therefore, when the servo chamber 16 is put in open connection with upstream liquid, there will be a surplus of force to press the piston 14 against the seat 15 and thus block for through-flow.

The servo chamber 16 is arranged in a sleeve 18 around which the water has to flow when passing the valve. This sleeve 18 is kept in place in the valve housing 10 by guide fins 19, and is shaped with the view of keeping the flow resistance as low as possible. The number of guide fins typically may be three. Through one or more of these fins there are arranged ducts 20–22 having a respective opening towards downstream liquid, upstream liquid and the servo chamber 16, respectively. The regulating principle is based on the upstream pressure influencing a fill valve (not shown) which is arranged to open for connection between upstream liquid and the servo chamber 16 if the upstream pressure is lower than a preset minimum value P2, and in that case affect the main valve body 14 to be moved towards the seat 15. Correspondingly, the regulating valve is provided with a drain valve (not shown) dumping liquid from the servo chamber 16 if the liquid pressure at the downstream side is lower than a preset value P3. The fill and drain valves will be further described in connection with FIGS. 3–7. In order to secure that the minimum requirement with respect to upstream pressure is maintained, the supply capacity of the fill valve is considerably larger than the dumping capacity of the drain valve. Consequently, the regulating principle at any time will seek to regulate the opening cross-section so that the upstream pressure will not be lower than the minimum value P2, even if this entails that the downstream pressure becomes lower than the preset value P3.

The fill valve preferably will be constructed such that it is not closed completely even if the upstream pressure is higher than the preset minimum value P2. This is to compensate for possible smaller, unwanted leakages from the servo chamber 16.

In principle, one may freely choose the flow direction for the valve, on the assumption that the fill valve is always coupled towards upstream pressure and that the drain valve correspondingly is coupled towards downstream pressure.

For the use in fire water systems, it is desirable that the regulating valve can open for through-flow only if it has received an opening signal via an actuating means, and the upstream pressure thereafter rises to a preset value P1 as an indication that the pumps in the system have started.

A preferred embodiment of the regulating valve will be explained below with reference to FIGS. 3–7.

Figure 3:
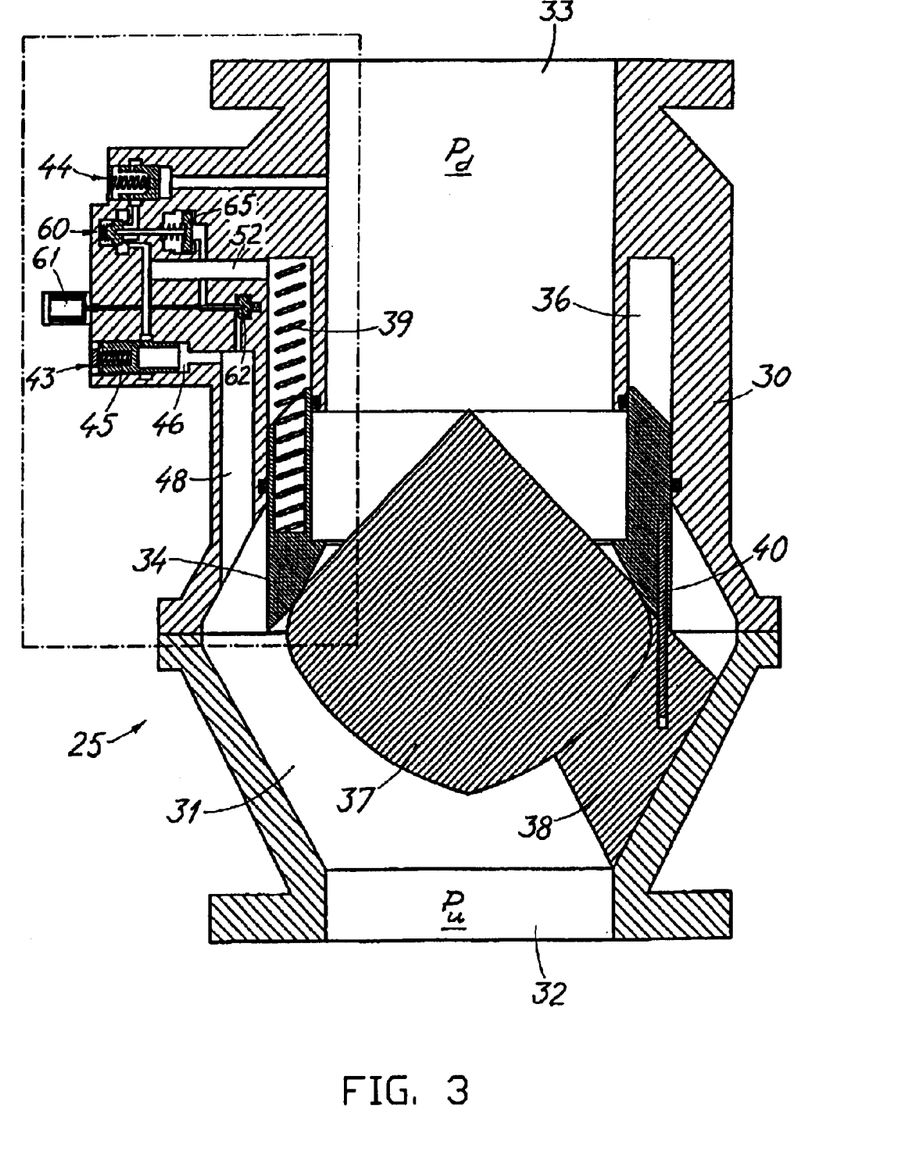
FIGS. 3 and 4 show longitudinal sectional views of a second embodiment of a regulating valve according to the invention, in closed and open position, respectively.
Figure 4:
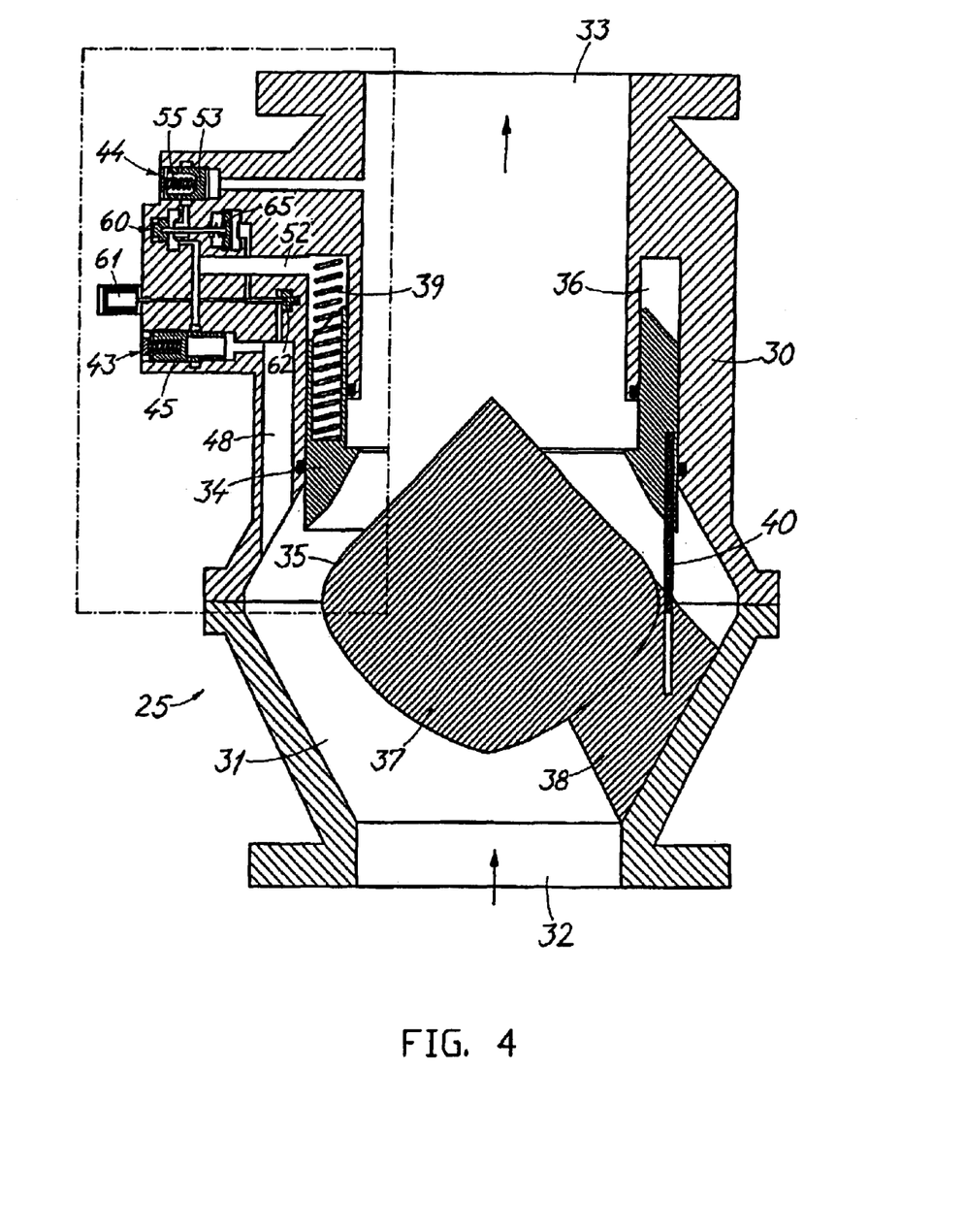

The regulating valve 25 shown in FIGS. 3 and 4 comprises a housing 30 having a is through passage 31 having an inlet 32 and an outlet 33. The valve comprises a main valve body 34 cooperating with a seat 35 for defining the through-flow cross-section of the passage 31. The flow direction is chosen as shown by arrows in FIG. 4, as the regulating valve should be mounted vertically with its inlet on the underside.

The main valve body 34 here is shaped as a circularly cylindrical pipe piece which is slidably arranged in a servo chamber 36 arranged in the valve housing 30. Further, the valve seat 35 is arranged on an approximately conically shaped sleeve 37 which is fixed in the housing by means of three guide fins 38. The seal may be metal to metal as suggested in the figures, or the seat surface alternatively may be provided with a resilient sealing material. The valve body 34 is affected by a number of springs 39 placed symmetrically in the servo chamber 36 and affecting the main valve body 34 in the direction towards the seat 35. A number of guide pins 40 are provided to secure a rectilinear movement of the valve body in relation to the seat.

In a manner corresponding to that of the embodiment according to FIGS. 2A–2B, the main valve body 34 has an end surface constituting a movable surface in the servo chamber 36, and the servo chamber is dimensioned such that the main valve body gets a net force surplus to be moved towards the seat 35 when the pressure of the servo chamber is increased up towards the upstream pressure $P_u$ of the valve.

Further, the regulating valve comprises a control valve means for affecting or influencing the movement of the main valve body 34, more specifically a first and second control valve 43, 44 which, under the influence of the upstream pressure $P_u$ and the downstream pressure $P_d$, respectively, are arranged to regulate the volume of the servo chamber 36 so that the main valve body 34 is moved in a direction causing an increased flow cross-section if the upstream pressure exceeds a preset minimum value P2, and the downstream pressure simultaneously is lower than a preset value P3, as mentioned in connection with FIG. 1. These control valves constitute the aforementioned fill and drain valves and will be further described below with reference to FIG. 5.

Figure 5:
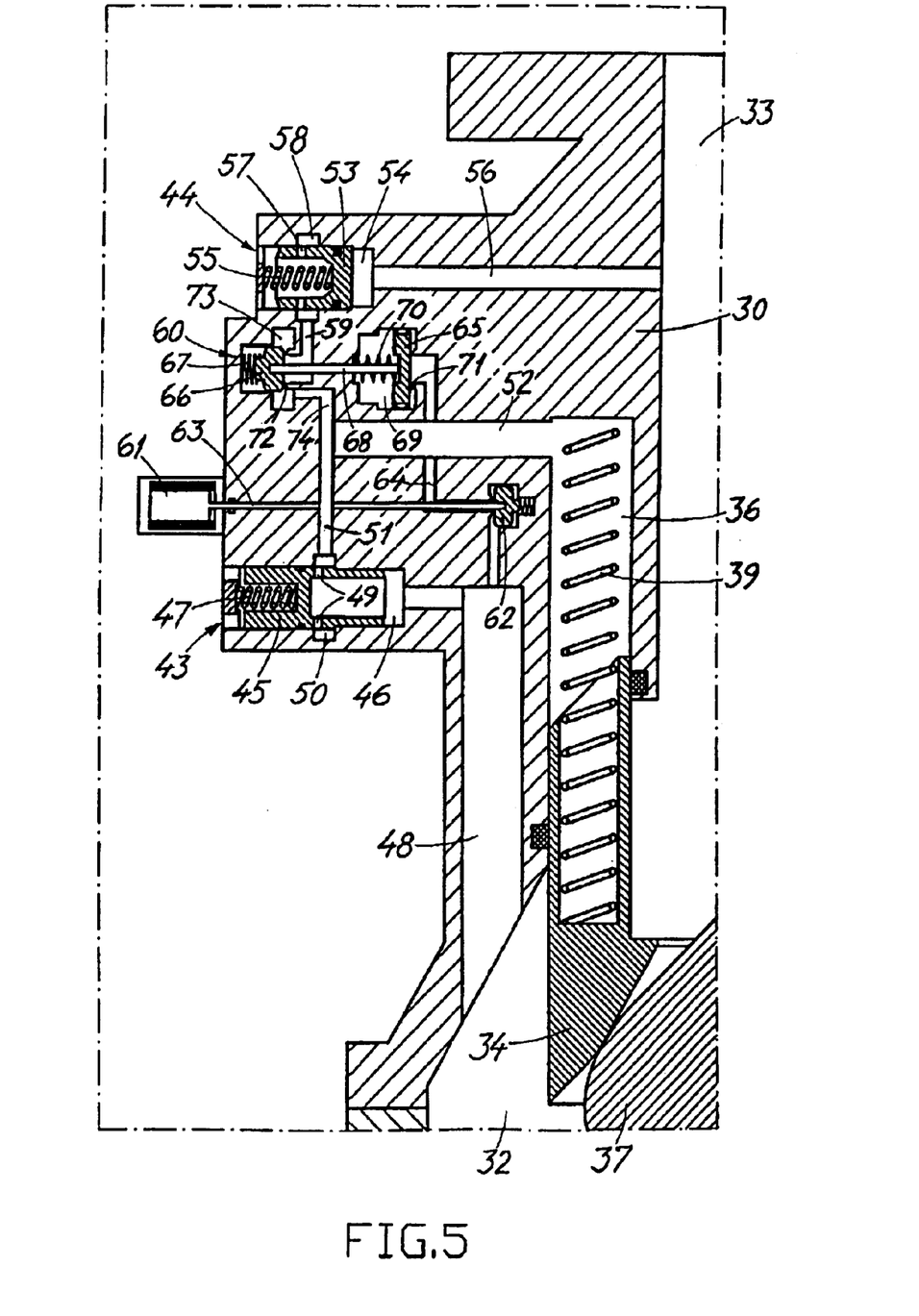
FIGS. 5–7 show in enlarged sectional views of a part of the regulating valve of FIGS. 3 and 4 in different functional positions.

The first control valve or fill valve 43 consists of valve body 45 which is slidably arranged in a cylindrical cavity 46 in the valve housing 30, and of which one end is under the influence of a prestressed spring 47. On the opposite side of the valve body 45, the cavity 46 communicates with the inlet 32 of the regulating valve, i.e. the upstream side, via a duct 48 arranged in the housing 30. The end position of the valve body 45 facing the duct 48 is sleeve-shaped and is provided with a pair of radially directed ports 49 which may be put in communication with a sleeve-surrounding annulus 50, dependent on the position of the valve body 45 in the cavity 46. The annulus communicates with the servo chamber 36 via a passage 51 and duct 52 in the valve housing 30.

The second control valve or drain valve 44 consists of a valve body 53 which is slidably arranged in a cylindrical cavity 54 in the valve housing 30, and of which one end is under the influence of a prestressed spring 55. On the opposite side of the valve body 53, the cavity 54 communicates with the outlet 33 of the regulating valve, i.e. the downstream side, via a passage 56 in housing 30. The side of the valve body 53 which is affected by the spring 55, is sleeve-shaped and has an open connection with the surrounding atmosphere. Further, the sleeve-shaped portion is provided with a pair of radially directed ports 57 which may be put in communication with a sleeve-surrounding annulus 58, dependent on the position of the valve body 53 in the cavity 54. The annulus 58 communicates with a passage 59 which may be put in connection with the servo chamber 36 via an activating valve 60 which will be further described below.

As mentioned above, it is desirable that the regulating valve, when used in fire water systems, can only be opened if it has received an opening signal via an activating means, and the upstream pressure thereafter rises to a preset value P1 as an indication that the pumps in the system have started. In the illustrated embodiment, the activating means consists of a solenoid 61 connected to a spring-loaded valve body 62 via an operating rod 63. The valve body 62 is arranged to open or close a passage 64 forming a connection between the duct 48, i.e. the upstream side, and one side of a piston 65 which is arranged to affect the activating valve 60, as described below.

The activating valve 60 comprises a valve body 66 which is slidably arranged in the housing 30 and of which one side is under the influence of a prestressed spring 67. The other side of the valve body is connected to the above-mentioned piston 65 via a piston rod 68, more specifically on the side of the piston which is opposite to the is passage 64. The piston is slidable in a cavity 69 which is open towards the surrounding atmosphere. Further, the piston 65 is affected by a spring 70 seeking to press the piston towards a seat 71 to close the above-mentioned passage 64.

The side of the activating valve body 66 which is connected to the piston 65, co-operates with a seat 72, so that the valve body, when raised from the seat, opens a connection between the passage 59 and the duct 52 towards the servo chamber 36, more specifically via an annulus 73 and a passage 74 connected to the duct 52.

The manner of operation of the regulating valve will be further described below.

FIGS. 3 and 5 show the regulating valve in a situation before the solenoid 61 is activated. The upstream pressure $P_u$ here is not sufficiently large to overcome the tension in the spring 47 of the fill valve, which thereby presses the fill valve body 45 to the right. In this situation the ports 49 in the valve body see to it that there is an open connection between the upstream side 32 and the servo chamber 36. The valve body 66 of the activating valve 60 is in the closed position against its seat, and thus prevents liquid from being dumped from the servo chamber 36 via the drain valve body 53. Consequently, the regulating valve is completely closed.

FIG. 4 shows the valve in a normal operating situation. The solenoid 61 is now activated so that the valve body 62 is pressed to the right, away from its seat. Upstream liquid pressure thereby affects the right side of the piston 65. Further, the upstream liquid pressure has exceeded the preset start value P1, and the pressure forces seeking to press the piston 65 to the left, thereby have exceeded the prestressing of the spring 70. As soon as the piston 65 has been pressed away from its seat 71, the whole right side surface thereof is affected by upstream liquid pressure. Consequently, the piston is pressed further to the left, and thereby sees to it that the valve body 66 is pressed away from its seat 72. Thereby an open connection is established between the servo chamber to 36 and the drain valve body 53, so that the regulating function has come into operation. In FIG. 4, the flow cross-section of the regulating valve has adjusted itself so that the downstream pressure is maintained on the desired value P3.

Figure 6:
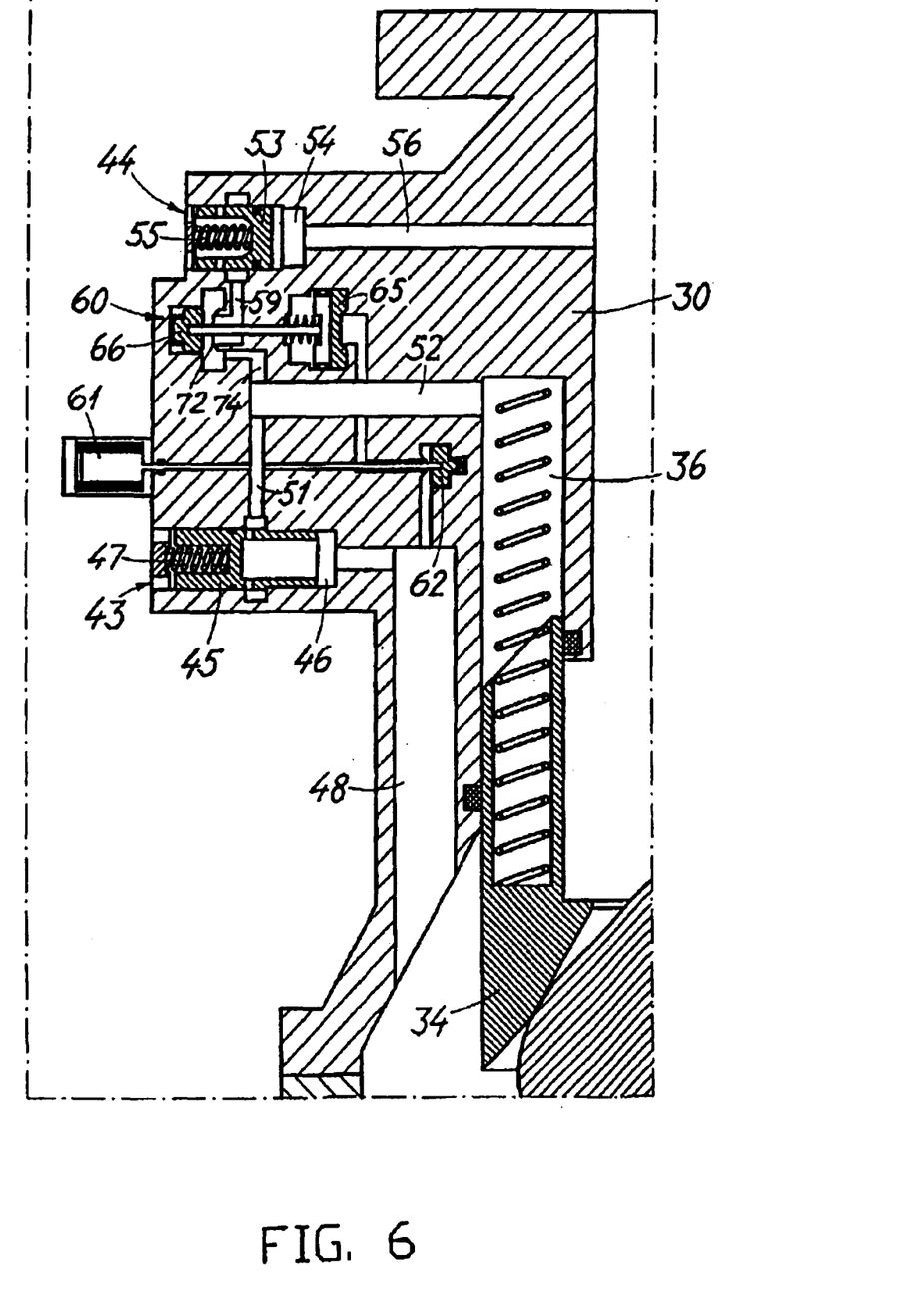

FIG. 6 shows an intermediate situation for the regulating valve. The solenoid 61 has been activated, and the upstream pressure has just exceeded P1 so that the regulating valve is in the process of opening. The main valve body 34 still rests against the seat 35, and the downstream pressure therefore is approximately equal to zero.

Figure 7:
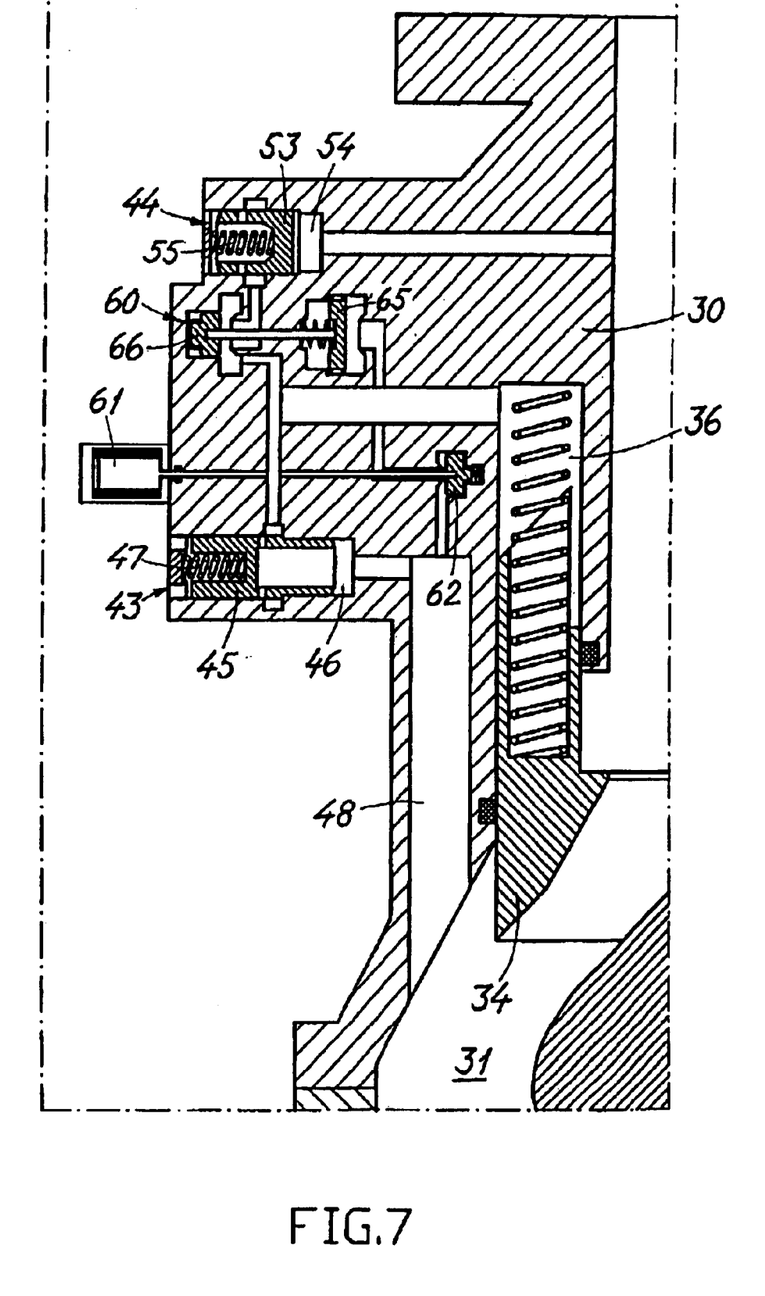

FIG. 7 shows the position of the respective valve bodies when the regulating valve is in the normal operating situation wherein the downstream pressure has adjusted itself to the preset value P3. This will normally be an approximately static situation wherein the drain valve 44 dumps equally much liquid as that supplied by the fill valve 43.

In the illustrated embodiment one may set three different parameters. This applies to the activating pressure P1 which is the minimum upstream pressure which is required to be sensed against the piston 65 in order for the regulation to start. The activating pressure is varied by changing the prestressing of the spring 70. The second parameter is the minimum upstream pressure P2. This minimum pressure is determined by the prestressing of the spring 47. The third parameter is the desired downstream pressure P3. This is determined from the prestressing of the spring 55.

During operation of fire water systems there may be a risk for freezing. In practice it will therefore be of interest to see to it that all movable parts of the regulating valve are given a small through-flow of water. This may be accomplished in a simple manner without changing the regulating principle.

What is claimed is:

1. A system for controlling the working conditions for mechanical pumps supplying associated devices with pressure fluid via a pipe system, comprising a regulating valve (6) situated between at least one of the pumps (1) and an appurtenant device (5) supplied by the pump, said regulating valve being arranged to open only when the pump (1) has started up, said regulating valve comprising means for adjustment of the flow cross-section of said regulating valve to maintain downstream pressure at or above a value (P3) which is predetermined based upon specifications of the pipe system and said device (5), and to maintain the counterpressure of the pump (1) not below a given minimum value (P2) which is determined from the characteristic properties of the pump, whereby, in adjustment of said flow cross-section, priority is given to maintaining the counterpressure of the pump (1) not below said minimum value (P2) rather than to maintaining the downstream pressure of said regulating valve at or above said value (P3).

2. The system according to claim 1 wherein said regulating valve comprises a housing (30) having a through passage (31) for through-flow of a fluid via an inlet (32) having an upstream pressure and via an outlet (33) having a downstream pressure, a main valve body (34) defining the flow cross-section of the passage (31) in cooperation with a valve seat (35), and a servo chamber (36) communicating with a control valve means (43, 44) for influencing the movement of the main valve body (34), wherein the main valve body (34) comprises an end surface comprising a movable surface movably arranged in the servo chamber (36), the servo chamber (36) being so dimensioned in relation to the sealing surface of the valve seat (35) that the main valve body (34) has a net force surplus so as to be moved towards the seat when the pressure in the servo chamber (36) is increased towards the upstream pressure of the valve, and wherein the control valve means comprises a first (43) and a second (44) control valve which, under the influence of the upstream pressure and the downstream pressure, respectively, are arranged to regulate the volume of the servo chamber (36) so that the main valve body (34) is moved in a direction causing an increased flow cross-section if the upstream pressure exceeds a preset minimum value (P2) and the downstream pressure simultaneously is lower than a preset value (P3).

3. The system according to claim 2, wherein the first control valve (43) is a fill valve which is arranged to open a connection (51, 52) between said inlet (32) and the servo chamber (36) if the upstream pressure is lower than the preset minimum value (P2), so that the main valve body (34) is moved towards the seat (35), and wherein the second control valve (44) is a drain valve which is arranged to dump fluid from the servo chamber (36) if the downstream pressure is lower that the preset value (P3).

4. The system according to claim 3, wherein the supply capacity of the fill valve (43) is larger than the dumping capacity of the drain valve (44), so that the upstream pressure does not become lower than the preset minimum value (P2), even if, as a result, the downstream pressure becomes lower than the preset value (P3) thereof.

5. The system according to claim 4, further comprising an activating valve (60, 65) arranged in the housing (30), the activating valve being arranged to open a connection (52, 59, 74) between the servo chamber (36) and the drain valve (44) when the upstream pressure exceeds a preset start value (P1), and an activating means (61, 62) which is arranged to open a connection (64) between the valve inlet (32) and said activating valve.

6. The system according to claim 5, wherein the activating means comprises a solenoid (61) opening said connection (64) by the supply of an electric signal.

7. The system according to claim 6, wherein the activating valve (60) comprises a piston (65) whose movement is influenced by the upstream pressure and in the opposite direction of a prestressed spring (70) determining said start value (P1) of the upstream pressure.

8. The system according to claim 4, wherein the fill valve (43) comprises a valve body (45) whose movement is influenced by a prestressed spring (47) determining the preset minimum value (P2) of the upstream pressure.

9. The system according to claim 4, wherein the drain valve (44) comprises a valve body (53) whose movement is influenced by a prestressed spring (55) determining the preset value (P3) of the downstream pressure.

10. The system according to claim 3, further comprising an activating valve (60, 65) arranged in the housing (30), the activating valve being arranged to open a connection (52, 59, 74) between the servo chamber (36) and the drain valve (44) when the upstream pressure exceeds a preset start value (P1), and an activating means (61, 62) which is arranged to open a connection (64) between the valve inlet (32) and said activating valve.

11. The system according to claim 10, wherein the activating means comprises a solenoid (61) opening said connection (64) by the supply of an electric signal.

12. The system according to claim 10, wherein the activating valve (60) comprises a piston (65) whose movement is influenced by the upstream pressure and in the opposite direction of a prestressed spring (70) determining said start value (P1) of the upstream pressure.

13. The system according to claim 3, wherein the fill valve (43) comprises a valve body (45) whose movement is influenced by a prestressed spring (47) determining the preset minimum value (P2) of the upstream pressure.

14. The system according to claim 3, wherein the drain valve (44) comprises a valve body (53) whose movement is influenced by a prestressed spring (55) determining the preset value (P3) of the downstream pressure.

* * * * *